(12) United States Patent
Zhou et al.

(10) Patent No.: US 10,146,238 B2
(45) Date of Patent: Dec. 4, 2018

(54) CMOS SUBTHRESHOLD REFERENCE CIRCUIT WITH LOW POWER CONSUMPTION AND LOW TEMPERATURE DRIFT

(71) Applicant: University of Electronic Science and Technology of China, Chengdu (CN)

(72) Inventors: Zekun Zhou, Chengdu (CN); Yao Wang, Chengdu (CN); Jianwen Cao, Chengdu (CN); Hongming Yu, Chengdu (CN); Yunkun Wang, Chengdu (CN); Anqi Wang, Chengdu (CN); Zhuo Wang, Chengdu (CN); Bo Zhang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 48 days.

(21) Appl. No.: 15/599,484

(22) Filed: May 19, 2017

(65) Prior Publication Data
US 2018/0164842 A1 Jun. 14, 2018

(30) Foreign Application Priority Data

Dec. 8, 2016 (CN) .......................... 2016 1 1119479

(51) Int. Cl.
*G05F 1/10* (2006.01)
*G05F 3/02* (2006.01)
(Continued)

(52) U.S. Cl.
CPC ................. *G05F 1/46* (2013.01); *G05F 3/16* (2013.01); *G05F 3/242* (2013.01); *H02J 7/0047* (2013.01); *H02J 2007/0095* (2013.01)

(58) Field of Classification Search
CPC . G05F 3/30; G05F 3/267; G05F 3/262; G05F 3/205; G11C 5/147
(Continued)

(56) References Cited

U.S. PATENT DOCUMENTS

| 2009/0002061 A1* | 1/2009 | Chen ....................... G05F 3/205 |
| | | 327/537 |
| 2009/0039861 A1* | 2/2009 | Wang ...................... G05F 3/245 |
| | | 323/313 |
| 2013/0293215 A1* | 11/2013 | Lym .......................... G05F 3/30 |
| | | 323/313 |

FOREIGN PATENT DOCUMENTS

KR 20140028447 A * 3/2014

* cited by examiner

*Primary Examiner* — Quan Tra
(74) *Attorney, Agent, or Firm* — Gokalp Bayramoglu

(57) ABSTRACT

A resistorless CMOS low power voltage reference circuit is provided. The start-up circuit is used to prevent the circuit to stay in the zero state and stop working when the circuit gets out of the zero state. The self-biased $V_{PTAT}$ generating circuit generate the voltage $V_{PTAT}$ which has positive temperature coefficient. The square-law current generating circuit generates a square-law current which is proportional to $\mu T^2$ through the $V_{PTAT}$. Finally, the reference voltage $V_{REF}$ is obtained by introducing the square-law current into the reference voltage output circuit. The reference voltage $V_{REF}$ of this application can realize approximative zero temperature coefficient in the temperature range of −40° C.~100° C. This application improves temperature characteristic which may be poorer due to temperature nonlinearity of carrier mobility based on the traditional subthreshold reference. This application can reduce the power consumption from μW level to nW level and realize low power consumption.

5 Claims, 2 Drawing Sheets

(51) Int. Cl.
  *G05F 1/46*   (2006.01)
  *G05F 3/24*   (2006.01)
  *G05F 3/16*   (2006.01)
  *H02J 7/00*   (2006.01)
(58) Field of Classification Search
  USPC .......................... 327/539; 323/313, 315, 316
  See application file for complete search history.

CMOS SUBTHRESHOLD REFERENCE CIRCUIT WITH LOW POWER CONSUMPTION AND LOW TEMPERATURE DRIFT

CROSS REFERENCE

The present application is based on, and claims priority from, Chinese application number 201611119479.6, filed on Dec. 8, 2016, the disclosure of which is hereby incorporated by reference herein in its entirety.

TECHNICAL FIELD

The present invention relates to the technical field of battery management, more particularly, to a subthreshold MOSFET based reference generating circuit with low power consumption.

BACKGROUND

In analog integrated circuits or mixed-signal design area, the reference voltage source is a very important and commonly used module, which is widely applied to circuits, such as AD/DA converter, power converter, power amplifier, and so on. The reference voltage source has the function of providing the system with a voltage reference which is independent of the temperature and power supply. As the supply voltage decreases, the design of the reference source with low-voltage and low-power, low temperature coefficient and high PSRR becomes critical. At present, the voltage reference circuit using low voltage power supply and having low power consumption has special and important significance. With the gradual increase in popularity of mobile electronic devices, the power supply voltage of the analog integrated circuit is required to be reduced to about 1V, and power consumption is required to be at a level of uW. Therefore, the design of the reference source with low temperature coefficient, low power consumption and high PSRR is very important, and it is the future direction of development.

Like the bandgap reference, two voltages are required for producing the final output reference voltage. One is the voltage with a positive temperature coefficient, and the other is a voltage with a negative temperature coefficient. The output reference voltage with nearly zero temperature coefficient can be produced by adding these two voltages in a certain ratio. Different from the conventional bandgap reference circuit, the voltage with positive temperature coefficient changes from $\Delta V_{BE}$ to $\Delta V_{GS}$, and the voltage with negative temperature coefficient is produced by the threshold voltage $V_{THN}$ of NMOS transistor. As shown in FIG. 1, the block diagram of implementation of subthreshold based CMOS voltage reference circuit normally comprises 5 parts. The biasing part of the circuit is configured to provide a sub-threshold current for the circuit. The start-up circuit is configured to solve the zero-state problem of the circuit. The $\Delta V_{GS}$ generation circuit utilizes the drain-source current characteristics of the subthreshold MOSFET to produce a voltage with positive temperature coefficient. The $V_{CTAT}$ generation circuit produces a voltage with negative temperature coefficient. The final reference voltage is obtained by adding the positive and negative temperature coefficient voltages mentioned above in a certain proportion.

The principle of $\Delta V_{GS}$ generation circuit can be represented as follows:

The drain-source current of the subthreshold MOSFET can be represented in equation as follows:

$$I_{DS\_sub} = \mu C_{OX} W/L (m-1) V_T^2 e^{V_{GS}-V_{TH}/mV_T}(1-e^{-V_{DS}/V_T}) \quad (1)$$

where $\mu$ is the mobility, $C_{ox}$ is the gate oxide capacitor per unit area, m is the reciprocal of the gate and channel surface coupling factor, $V_T$ is the thermal voltage, W and L are the width and length of MOSFET respectively, and $V_{TH}$ is the threshold voltage of MOSFET.

The last part of the equation can be approximated to 1 when the MOSFET drain-source voltage $V_{DS}$ is greater than 0.1V. Therefore, the drain-source current of the subthreshold MOSFET can be represented in an equation as follows:

$$I_{DS\_sub} = \mu C_{OX} W/L (m-1) V_T^2 e^{V_{GS}-V_{TH}/mV_T} = I_0 W/L e^{V_{GS}-V_{TH}/mV_T} \quad (2)$$

The linear equation in relation to thermal voltage $V_T$, i.e., the PTAT voltage, can be obtained through the difference between the gate-source voltages $V_{GS}$ of two subthreshold MOSFETs which are proportional to the drain-source currents.

The conventional subthreshold voltage reference circuit can be explained in FIG. 4. In the conventional sense, $V_{GS}$ of the subthreshold MOSFET that is proportional to two drain-source currents is considered as a liner positive temperature coefficient voltage, which can be represented in an equation as follows:

$$\Delta V_{GS} = m V_T \ln N \quad (3)$$

where N is the ratio of the drain-source currents of the two subthreshold MOSFETs, $V_T$ is the thermal voltage, and m is the reciprocal of the gate and channel surface coupling factor.

Actually, in is not independent of the temperature. m shows positive temperature characteristics at high temperature, particularly in a temperature range of 85° C. or higher. Therefore, the conventional subthreshold reference circuit mores the variation of m, resulting non-optimized temperature characteristics of the circuit. ignoring the variation of m means the conventional subthreshold reference circuit has a narrow applicable temperature range. On the other hand, the power consumption of conventional reference is on the level of μW. There is also a large space for optimization relative to the level of μ W, even to the level of pW.

SUMMARY OF THE INVENTION

The present invention solves the problems of temperature characteristics and μW level power consumption of the conventional low power reference source generated based on the subthreshold MOSFET. The application proposes a CMOS subthreshold reference circuit with low power consumption and low temperature drift, which realizes the characteristic of approximative zero temperature in the temperature range of −40° C.˜ 100° C. and a self-biased ultra-low power consumption subthreshold reference source at a nW level.

The technical solution of the present invention is:

A CMOS subthreshold reference circuit with low power consumption and low temperature drift includes a start-up circuit a self-biased $V_{PTAT}$ generating circuit, a square-law current generating circuit, and a reference voltage output circuit. The output of the start-up circuit is connected to the input of the self-biased $V_{PTAT}$ generating circuit. The square-law current generating circuit is connected between the self-biased $V_{PTAT}$ generating circuit and the reference output circuit. The positive temperature coefficient voltage, i.e., PTAT voltage $V_{PTAT}$, generated by the self-biased $V_{PTAT}$ generating, circuit is used to generate the square-law current, and the square-law current is then introduced into the reference voltage output circuit to obtain the final $V_{REF}$.

Particularly the start-up circuit comprises the first NMOS transistor $M_{N1}$, the second NMOS transistor $M_{N2}$, the third NMOS transistor $M_{N3}$, the first PMOS transistor $M_{P1}$ and the second PMOS transistor $M_{P2}$. The first NMOS transistor $M_{N1}$ serves as a start-up capacitor. The drain and source of the first NMOS transistor $M_{N1}$ are connected to ground potential, and the gate of the first NMOS transistor $M_{N1}$ is connected to the drain of the first PMOS transistor $M_{P1}$. The first PMOS transistor $M_{P1}$ is used as a start-up switch transistor. The gate of the first PMOS transistor $M_{P1}$ is connected to the power supply voltage VCC. The second PMOS transistor $M_{P2}$ and the second NMOS transistor $M_{N2}$ are connected together in the form of a basic inverter. The gates of the second PMOS transistor $M_{P2}$ and the second NMOS transistor $M_{N2}$ are connected to each other and connected to the drain of the first PMOS transistor $M_{P1}$. The drains of the second NMOS transistor $M_{N2}$ and the second PMOS transistor $M_{P2}$ are connected to each other and connected to the gate of the third NMOS transistor $M_{N3}$. The source of the second NMOS transistor $M_{N2}$ is connected to GND. The source of the second PMOS transistor $M_{P2}$ is connected to VCC. The source of the third NMOS transistor $M_{N3}$ is connected to GND and the drain of the third IN transistor $M_{N3}$ is used as the output of the start-up circuit.

Particularly, the self-biased $V_{PTAT}$ generating circuit comprises the third PMOS transistor $M_{P3}$, the fourth PMOS transistor $M_{P4}$, the fourth NMOS transistor $M_{N4}$, the fifth NMOS transistor $M_{N5}$ and the sixth NMOS transistor $M_{N6}$. The output of the start-up circuit is connected to the gate and the drain of the third PMOS transistor $M_{P3}$. The third PMOS transistor $MF_{P3}$ and the fourth PMOS transistor $M_{P4}$ form a basic current mirror connection. The gates of the third PMOS transistor $M_{P3}$ and the fourth PMOS transistor $M_{P4}$ are connected together and the sources are connected to VCC. The drain of the fourth NMOS transistor $M_{N4}$ is connected to the drain of the third. PMOS transistor $M_{P3}$, and the gate of the fourth NMOS transistor $M_{N4}$ is connected to the gate of the fifth NMOS transistor $M_{N5}$, the gate and the drain of the sixth NMOS transistor $M_{N6}$, and the drain of the fourth PMOS transistor $M_{P4}$. The sources of the fourth NMOS transistor $M_{N4}$ and the fifth NMOS transistor $M_{N5}$ are connected to the around. The substrates of the fifth NMOS transistor $M_{N5}$ and the sixth NMOS transistor $M_{N6}$ are connected to each other and connected to the ground. The drain of the fifth NMOS transistor $M_{N5}$ is connected to the source of the sixth NMOS transistor $M_{N6}$, and the connecting node serves as the output of the self-biased $V_{PTAT}$ generating circuit.

Particularly, the square-law current generating circuit includes the fifth PMOS transistor $M_{P5}$ and the seventh NMOS transistor $M_{N7}$. The drains of the fifth MOS transistor $M_{P5}$ and the seventh MOS transistor $M_{N7}$ are connected together and connected to the output of the self-biased $V_{PTAT}$ generating circuit. The source of the fifth PMOS transistor $M_{P5}$ is connected to the power supply voltage VCC, and the source of the seventh NMOS transistor $M_{N7}$ is grounded.

Particularly, the reference voltage output circuit includes the sixth PMOS transistor $M_{P6}$ and the eighth NMOS transistor $M_{N8}$. The gate of the sixth PMOS transistor $M_{P6}$ is connected to the gate of the fifth PMOS transistor $M_{P5}$ in the square-law current generating circuit and is connected to the gate of the fourth PMOS transistor $M_{P4}$ in the self-biased $V_{PTAT}$ generating circuit. The gate and the drain of the eighth NMOS transistor $M_{N8}$ are connected to each other and connected to the gate of the seventh NMOS transistor $M_{N7}$ in the square-law current generating circuit. The source of the sixth PMOS transistor $M_{P6}$ is connected to the source voltage VCC, and the source of the eighth NMOS transistor $M_{N8}$ is grounded. The drains of the sixth PMOS transistor $M_{P6}$ and the eighth NMOS transistor $M_{N8}$ are connected together, and the connecting node is used as an output of the reference voltage output circuit to output reference voltage VREF.

In particular, the square-law current is proportional to $\mu T^2$, where $\mu$ is the carrier mobility, and T is the temperature.

The gain effect of the present embodiments: the reference voltage VREF can realize the characteristic of approximative zero temperature in the temperature range of −40° C.~100° C.; the issue that the temperature characteristic becomes worse due to the temperature nonlinearity of the carrier mobility is improved on the basis of the traditional subthreshold reference; power consumption is reduced from a μW level to nW level such that low power consumption is realized.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
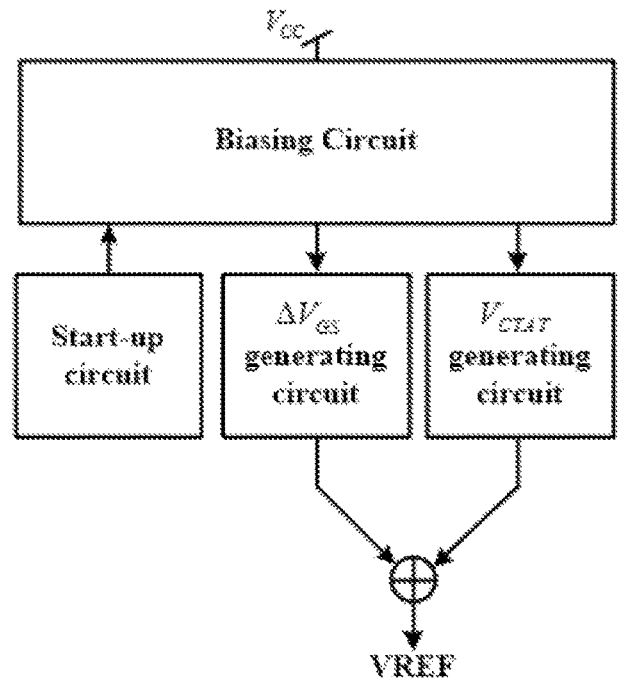
FIG. 1 is a basic structural diagram of a subthreshold based. CMOS reference source in prior art.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the present disclosure may repeat reference numerals and letters in the various example. This repetition is for the purpose of simplicity and clarity and dose not in itself dictate a relationship between the various embodiments and configurations discussed.

Accompanying the following drawings, the referred embodiments are provided to describe, not to limit, technical approaches in the present invention. Obviously, bearing the essence and concept of the present invention, technologists in this field can make various changes and modifications to the present invention. It should be understood that those changes and modifications are also covered by claims of the present invention, if they are with the same purpose and within the same scope of the present invention. It should be understood that such terms such as first, second, etc., are configured to only denote devices but not to limiting the devices.

The terms being used hereinafter are used to describe the referred embodiment but not to limit the invention. Unless being noted in contents, the use of singular or plural nouns shall not limit the invention.

It should be understood that the use of "comprise" shall not limit the invention about describing or listing features and characteristics of the circuit. There may exist other features and characteristics of the circuit which has not been covered or listed in the invention.

The invention will be further elucidated with reference to the accompanying, drawings and specific examples.

Figure 2:
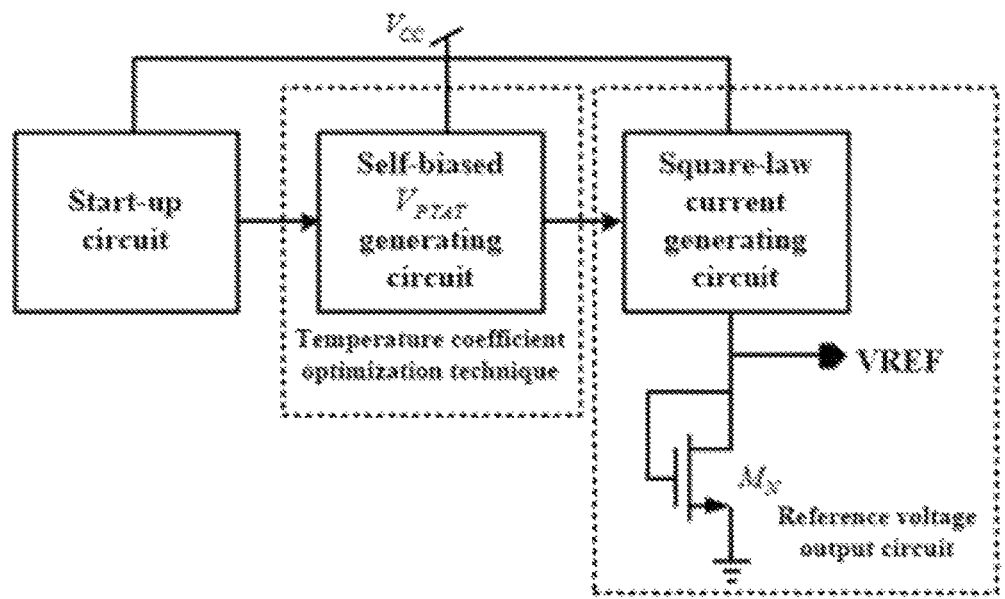
FIG. 2 is the topological structure schematic of the CMOS subthreshold reference circuit with low power consumption and low temperature coefficient proposed in this patent.

The system topology diagram of the high-precision self-starting power supply circuit proposed by the invention is shown in FIG. 2. It comprises four parts: the start-up circuit, the self-biased $V_{PTAT}$ generating circuit, the square-law current generating circuit, and the reference voltage output circuit. The start-up branch circuit pulls the voltage of the gate terminal of the third PMOS transistor $M_{P3}$ down during the circuit initialization stage to make the circuit out of the zero state. The start-up branch circuit will stop working after a period of time. The self-biased $V_{PTAT}$ generating circuit provides a positive temperature coefficient voltage by using the difference between $V_{GS}$ of the fifth NMOS transistor $M_{N5}$ and $V_{GS}$ of the sixth NMOS transistor $M_{N6}$ which are operating in the subthreshold region. The self-biased $V_{PTAT}$ generating circuit converts the positive temperature coefficient voltage to a current proportional to $\mu T^2$. The reference voltage output circuit makes the current proportional to $\mu T^2$ converted by the eighth NMOS transistor $M_{N8}$ to output a reference voltage.

Detailed analysis will be provided below with reference to the operation of the circuit in combination with the actual circuit diagram.

Figure 3:
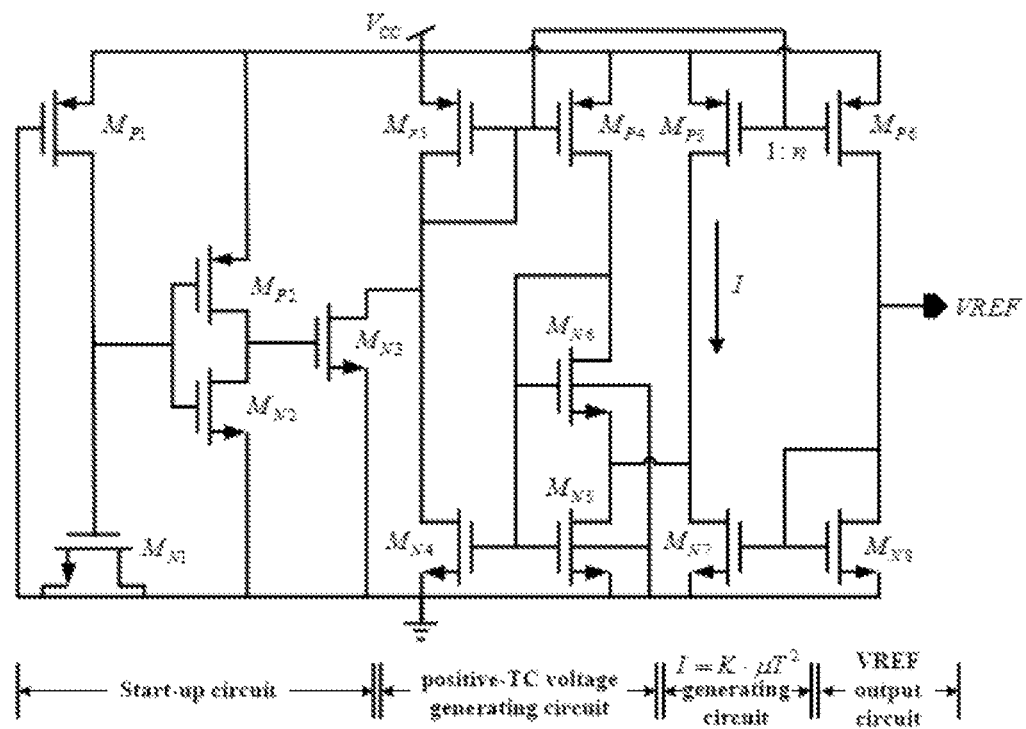
FIG. 3 is the whole schematic of this patent of the CMOS low power low temperature coefficient subthreshold reference circuit proposed in this patent.
Figure 4:
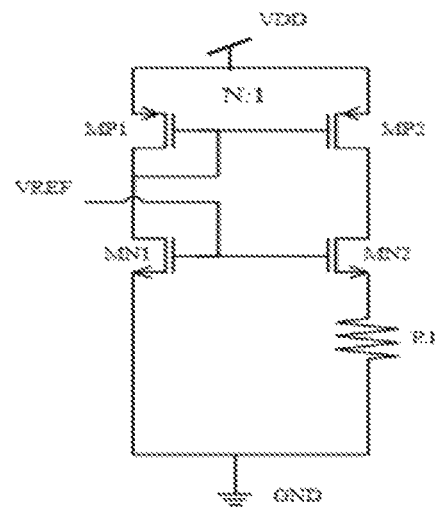
FIG. 4 is the PTAT voltage generating module of conventional, voltage reference circuit.

FIG. 3 shows the schematic diagram of the proposed CMOS subthreshold reference circuit with low power consumption and low temperature drift. The start-up circuit comprises the first NMOS transistor $M_{N1}$, the second NMOS transistor $M_{N2}$, the third NMOS transistor $M_{N3}$, the first PMOS transistor $M_{P1}$, and the second PMOS transistor $M_{P2}$. The first NMOS transistor $M_{N1}$ is used as a starting capacitor. The drain and source of the first NMOS transistor $M_{N1}$ are connected to ground potential, and the gate of the first NMOS transistor $M_{N1}$ is connected to the drain of the first PMOS transistor $M_{P1}$. The first PMOS transistor $M_{P1}$ is used as a start-up switch transistor. The gate of the first PMOS transistor $M_{P1}$ is connected to ground potential and the source of the first PMOS transistor $M_{P1}$ is connected to the VCC. The second NMOS transistor $M_{N2}$ and the second PMOS transistor $M_{P2}$ are connected together in the form of basic inverter. The gates of the second NMOS transistor $M_{N2}$ and the second PMOS transistor $M_{P2}$ are connected to each other and connected to the drain of the first PMOS transistor $M_{P1}$. The drains of the second NMOS transistor $M_{N2}$ and the second PMOS transistor $M_{P2}$ are connected to each other and connected to the drain of the third NMOS transistor $M_{N3}$. The source of the second NMOS transistor $M_{N2}$ is connected to GND and the source of the second PMOS transistor $M_{P2}$ is connected to VCC. The source of the third NMOS transistor $M_{N3}$ is connected to GND and the drain of the third NMOS transistor $M_{N3}$ is used as the output of start-up branch circuit.

During the power-on stage, the initial voltage of the first NMOS transistor $M_{N1}$ serving as the starting capacitor is zero. At this time, the third NMOS transistor $M_{N3}$ is on and the voltage of the third NMOS transistor $M_{N3}$ is pulled down. The circuit enters the working state. Meanwhile, the first PMOS transistor $M_{P1}$ charges for the first NMOS transistor $M_{N1}$. When the voltage at both ends of the first NMOS transistor $M_{N1}$ is as high as the inverting threshold (close to 0.5 VCC) of the inverter, the third NMOS transistor $M_{N3}$ is turned off and the start-up branch circuit exits. Finally, the potential at both ends of the first NMOS transistor $M_{N1}$ will be close to VCC.

As shown in FIG. 3, the self-biased VPTAT generating circuit comprises the third. PMOS transistor $M_{P3}$, the fourth PMOS transistor $M_{P4}$, the fourth NMOS transistor $M_{N4}$, the fifth NMOS transistor $M_{N5}$ and the sixth NMOS transistor $M_{N6}$. The output of the start-up circuit is connected to the gate and drain of the third PMOS transistor $M_{P3}$. The third PMOS transistor $M_{P3}$ and the fourth PMOS transistor $M_{P4}$ form a basic current mirror connection. The gates of the third PMOS transistor $M_{P3}$ and the fourth PMOS transistor $M_{P4}$ are connected together and their sources are connected to VCC. The drain of the fourth NMOS transistor $M_{N4}$ is connected to the drain of the third PMOS transistor $M_{P3}$, and the gate of the fourth NMOS transistor $M_{N4}$ is connected to the gate of the fifth NMOS transistor $M_{N5}$, the gate of the sixth NMOS transistor $M_{N6}$, and the drain of the fourth PMOS transistor $M_{P4}$. The sources of the fourth NMOS transistor $M_{N4}$ and the fifth NMOS transistor $M_{N5}$ are connected to the ground. The substrates of the fifth NMOS transistor $M_{N5}$ and the sixth NMOS transistor $M_{N6}$ are connected to each other and connected to the ground. The drain of the fifth NMOS transistor $M_{N5}$ is connected to the source of the sixth NMOS transistor MN6, and the connection node serves as the output of self-biased $V_{PTAT}$ generating circuit.

The fifth NMOS transistor $M_{N5}$ and the sixth NMOS transistor $M_{N6}$ operate in the subthreshold region. The output voltage $V_{PTAT}$ can be represented in equation as follows:

$$V_{PTAT} = V_{GS,MN5} - V_{GS,MN6} \quad (4)$$
$$= V_{TH,MN5} - V_{TH,MN6} + mV_T \ln N$$

where m is the reciprocal of gate and channel surface coupling factor, and $V_T$ is the thermal voltage. The difference between $V_{TH, MN5}$ and $V_{TH, MN6}$ is due to the difference in substrate voltage $V_{SB}$. The relationship between the threshold voltage and substrate bias voltage $V_{SB}$ can be represented in equation as follows:

$$V_{TH} = V_{TH0} + \gamma(\sqrt{|2\Phi_F + V_{SB}|} - \sqrt{|2\Phi_F|}) \quad (5)$$

where $V_{TH0}$ is the threshold voltage without substrate bias effect, $\Phi_F$ is the Substrate Fermi potential, and $\gamma$ is the substrate bias effect factor. $V_{SB}$ is the substrate bias voltage.

$$\gamma = \sqrt{2q\varepsilon_{si}N_{sub}}/C_{OX} \quad (6)$$

Then the difference of the threshold voltages in equation (4) can be represented in equation as follows:

$$V_{TH,MN5} - V_{TH,MN6} = \gamma(\sqrt{|2\Phi_F + V_{PTAT}|} - \sqrt{|2\Phi_F|}) \quad (7)$$

A Taylor's approximation can be applied to the part of the above equation in parentheses:

$$V_{TH,MN5} - V_{TH,MN6} = \frac{\gamma}{2\Phi_F} V_{PTAT} \quad (8)$$

-continued $$= \frac{\sqrt{2q\varepsilon_{si}N_{sub}}/C_{OX}}{2\Phi_F} V_{PTAT}$$

$$= (1-m)V_{PTAT}$$

Then it can be substituted into equation (4):

$$V_{PTAT} = \ln N \times V_T \qquad (9)$$

where in is a temperature-dependent factor, and N is the size ratio of the sixth NMOS transistor $M_{N6}$ to the fifth NMOS transistor $M_{N5}$. m can be eliminated in the proposed structure of the present invention, i.e. the resulting positive temperature voltage $V_{PTAT}$ is only related to $V_T$ and is independent of in and the resulting positive temperature voltage is standard linear.

As shown in FIG. 3, the square-law current generating circuit includes the fifth PMOS transistor $M_{P5}$ and the seventh NMOS transistor $M_{N7}$. The drains of the fifth MOS transistor $M_{P5}$ and the seventh MOS transistor $M_{N7}$ are connected together and connected to the output of self-biased $V_{PTAT}$ generating circuit. The source of the fifth PMOS transistor $M_{P5}$ is connected to the power supply voltage VCC, and the source of the seventh NMOS transistor $M_{N7}$ is rounded.

The reference voltage output circuit includes the sixth PMOS transistor $M_{P6}$ and the eighth NMOS transistor $M_{N8}$. The gate of the sixth PMOS transistor $M_{P6}$ is connected to the gate of the fifth PMOS transistor $M_{P5}$ in the square-law current generating circuit and the gate of the fourth PMOS transistor $M_{P4}$ in the self-biased $V_{PTAT}$ generating circuit. The gate and the drain of the eighth NMOS transistor $M_{N8}$ are connected to each other and connected to the gate of the seventh NMOS transistor $M_{N7}$ in the square-law current generating circuit. The source of the sixth PMOS transistor $M_{P6}$ is connected to the source voltage VCC, and the source of the eighth NMOS transistor $M_{N8}$ is grounded. The drains of the sixth PMOS transistor $M_{P6}$ and the eighth NMOS transistor MN8 are connected, and the connection node is used as an output node of the reference voltage output circuit to provide reference voltage $V_{REF}$.

An important thing to note here is that the seventh NMOS transistor operates in the triode region and the eighth NMOS transistor $M_{N8}$ Operates ire the saturation region. Therefore, it can be inferred that:

$$I = \mu_n C_{OX}(W/L)_{MN7}[(V_{GS,MN7} - V_{TH0})V_{PTAT} - \tfrac{1}{2}V_{PTAT}^2] \qquad (10)$$

From the structure, it can be seen that the seventh NMOS transistor $M_{N7}$ and the eighth NMOS transistor $M_{N8}$ have the same $V_{GS}$ and $V_{TH}$, and the above equation can be re-expressed as:

$$I = \mu_n C_{OX}(W/L)_{MN7}\left[\sqrt{\frac{2nI}{\mu_n C_{OX}(W/L)_{MN8}}} V_{PTAT} - \frac{1}{2}V_{PTAT}^2\right] \qquad (11)$$

where n is the mirror image ratio of the fifth PMOS transistor $M_{P5}$ and the sixth PMOS transistor $M_{P6}$ and I is solved as follows by the above equation:

$$I = K \times \mu_n C_{OX}\left(\frac{W}{L}\right)_{MN8} V_T^2 \qquad (12)$$

where K is the ratio coefficient. It can be represented in equation as follows:

$$K = \frac{N^2(\sqrt{2n} - \sqrt{2n - 2N_1})^2}{4N_1^2} \qquad (13)$$

$$= \left(\frac{N(\sqrt{2n} - \sqrt{2n - 2N_1})}{2N_1}\right)^2$$

where N is the size ratio of the sixth NMOS transistor $M_{N6}$ to the fifth NMOS transistor $M_{N5}$. $N_1$ is the size ratio of the eighth NMOS transistor $M_{N8}$ to the seventh NMOS transistor $M_{N7}$.

The $V_{REF}$ can be represented in equation as follows when current I flows through the eighth transistors $M_{N8}$ which operates in the saturation region:

$$V_{REF} = V_{GS,MN8} = \sqrt{\frac{2nI}{\mu_n C_{OX}(W/L)_{MN8}}} + V_{TH0} \qquad (14)$$

$$= \sqrt{2nK}\, V_T + V_{TH0}$$

According to this equation, the final reference voltage output is the sum of $V_T$ multiplied by a constant and $V_{TH0}$. $V_{TH0}$ has an approximately linear temperature property. The proper setting of the circuit parameters can make $V_{REF}$ almost temperature-independent in a wide range of temperature.

In some embodiments, the temperature range can be −40° C. to 100° C.

In some embodiments, the power consumption can be about 100 nW.

The key point of this patent is that the substrate-bias effect is skillfully used to get a linear positive temperature voltage with a wide temperature range, and then the operating regions of the subsequent seventh. NMOS transistor $M_{N7}$ and eighth NMOS transistor $M_{N8}$ are set to eliminate the effect of the temperature nonlinearity of the carriers such that a reference output with high temperature stability is obtained. Additionally, the self-biased circuit topology improves the PSRR of the output.

In the present invention, the fifth NMOS transistor $M_{N5}$ and the sixth NMOS transistor $M_{N6}$ operate in the subthreshold region, and power consumption is saved in comparison with the saturated region. Through the parameter optimization, the nw level of power consumption of the whole voltage reference is achieved. The voltage reference has low power consumption characteristics.

Those skilled in the art can make any other variations and combinations thereof within the essences of the present invention according to the technical insight disclosed in this application. These variations and combinations still fall within in the scope of this application.

What is claimed is:
1. A CMOS subthreshold reference circuit with low power consumption and low temperature drift, comprising
  a start-up circuit;
  a self-biased $V_{PTAT}$ generating circuit;
  a square-law current generating circuit;
  a reference voltage output circuit,
  wherein an output terminal of the start-up circuit is connected to an input terminal of the self-biased V PTAT generating circuit, the square-law current generating circuit is connected between the self-biased $V_{PTAT}$ generating circuit and the reference voltage output circuit, the self-biased $V_{PTAT}$ generating circuit provides the positive temperature coefficient voltage to generate a square-law current, and the square-law current is introduced into the reference voltage output circuit to obtain a reference voltage, and the square-law current is proportional to $\mu T^2$, where $\mu$ is carrier mobility, and T is temperature.

2. The CMOS subthreshold reference circuit with low power consumption and low temperature drift according to claim 1, wherein the start-up circuit comprises a first NMOS transistor, a second NMOS transistor, a third NMOS transistor, a first PMOS transistor, and a second PMOS transistor, the first NMOS transistor serves as a starting capacitor, a drain and a source of the first NMOS transistor are grounded, a gate of the first NMOS transistor is connected to a drain of the first PMOS transistor, the first PMOS transistor is used as a start-up switch transistor, a gate of the first PMOS transistor is grounded, a source of the first PMOS transistor is connected to a power supply voltage, the second PMOS transistor and the second NMOS transistor are connected together in a form of basic inverter, gates of the second PMOS transistor and the second NMOS transistor are connected to the drain of the first PMOS transistor, drains of the second NMOS transistor and the second PMOS transistor are connected to a gate of the third NMOS transistor, a source of the second NMOS transistor is grounded, a source of the second PMOS transistor is connected to the power supply voltage, a source of the third NMOS transistor is grounded, and a drain of the third NMOS transistor is used as an output of start-up circuit.

3. The CMOS subthreshold reference circuit with low power consumption and low temperature drift according to claim 1, wherein the self-biased $V_{PTAT}$ generating circuit comprises a third PMOS transistor, a fourth PMOS transistor, a fourth NMOS transistor, a fifth NMOS transistor, and a sixth NMOS transistor, the output of the start-up circuit is connected to a gate and a drain of the third PMOS transistor, the third PMOS transistor and the fourth PMOS transistor form a basic current mirror connection, the gate of the third PMOS transistor and a gate of the fourth PMOS transistor are connected together, sources of the third PMOS transistor and the fourth PMOS transistor are connected to the power supply voltage, a drain of the fourth NMOS transistor is connected to the drain of the third PMOS transistor, a gate of the fourth NMOS transistor is connected to a gate of the fifth NMOS transistor, a gate of the sixth NMOS transistor, and a drain of the fourth PMOS transistor, sources of the fourth NMOS transistor and the fifth NMOS transistor are grounded, substrates of the fifth NMOS transistor and the sixth NMOS transistor are grounded, a drain of the fifth NMOS transistor is connected to a source of the sixth NMOS transistor, and a connection node of the drain of the fifth NMOS transistor and the source of the sixth NMOS transistor serves as an output of the self-biased $V_{PTAT}$ generating circuit.

4. The CMOS subthreshold reference circuit with low power consumption and low temperature drift according to claim 1, wherein the square-law current generating circuit comprises a fifth PMOS transistor and a seventh NMOS transistor, drains of the fifth PMOS transistor and the seventh NMOS transistor are connected together to the output of the self-biased $V_{PTAT}$ generating circuit, a source of the fifth PMOS transistor is connected to the power supply voltage, and a source of the seventh NMOS transistor is grounded.

5. The CMOS subthreshold reference circuit with low power consumption and low temperature drift according to claim 1, wherein the reference voltage output circuit comprises a sixth PMOS transistor and an eighth NMOS transistor, a gate of the sixth PMOS transistor MP6 is connected to a gate of a fifth PMOS transistor in the square-law current generating circuit and a gate of a fourth PMOS transistor in the self-biased $V_{PTAT}$ generating circuit, a gate and a drain of the eighth NMOS transistor are connected to a gate of a seventh NMOS transistor in the square-law current generating circuit, a source of the sixth PMOS transistor is connected to the power supply voltage, a source of the eighth NMOS transistor is grounded, drains of the sixth PMOS transistor and the eighth NMOS transistor are connected together, a connection node of drains of the sixth PMOS transistor and the eighth NMOS transistor serves as an output of the reference voltage output circuit to provide the reference voltage.

* * * * *